(12) United States Patent
Otsubo

(10) Patent No.: US 10,365,769 B2
(45) Date of Patent: Jul. 30, 2019

(54) APPARATUS AND METHOD FOR CONTACTLESS INPUT

(71) Applicant: ASUKANET COMPANY, LTD., Hiroshima-shi, Hiroshima (JP)

(72) Inventor: Makoto Otsubo, Hiroshima (JP)

(73) Assignee: ASUKANET COMPANY, LTD., Hiroshima-shi (JP)

( * ) Notice: Subject to any disclaimer, the term of this patent is extended or adjusted under 35 U.S.C. 154(b) by 105 days.

(21) Appl. No.: 15/535,924

(22) PCT Filed: May 22, 2015

(86) PCT No.: PCT/JP2015/064747
§ 371 (c)(1),
(2) Date: Jun. 14, 2017

(87) PCT Pub. No.: WO2016/132568
PCT Pub. Date: Aug. 25, 2016

(65) Prior Publication Data
US 2018/0364868 A1 Dec. 20, 2018

(30) Foreign Application Priority Data
Feb. 16, 2015 (JP) ................................ 2015-027158

(51) Int. Cl.
*G06F 3/042* (2006.01)
*G06F 3/01* (2006.01)
(Continued)

(52) U.S. Cl.
CPC .............. *G06F 3/0421* (2013.01); *G06F 3/01* (2013.01); *G06F 3/0325* (2013.01);
(Continued)

(58) Field of Classification Search
CPC ................ G06F 3/0412; G06F 3/0421; G06F 2203/04108; G06F 3/0325; G06F 3/042
See application file for complete search history.

(56) References Cited

U.S. PATENT DOCUMENTS 6,184,863 B1 * 2/2001 Sibert .................... G06F 3/0325
345/156
6,971,021 B1 11/2005 Daspit et al.
(Continued)

FOREIGN PATENT DOCUMENTS

| JP | 2000-56928 A | 2/2000 |
|---|---|---|
| JP | 2006-39745 A | 2/2006 |

(Continued)

OTHER PUBLICATIONS

Decision to Grant a Patent dated Dec. 5, 2017, issued in counterpart Japanese Application No. 2016-079508, with English machine translation. (6 pages).

(Continued)

*Primary Examiner* — Hong Zhou
(74) *Attorney, Agent, or Firm* — Westerman, Hattori, Daniels & Adrian, LLP

(57) ABSTRACT

An apparatus for contactless input 10 having an optical image formation means 13 having cross disposed first and second reflective surfaces 20, 21 arranged numerously and standing on a same planar surface, a display 11 provided on one side of the optical image formation means 13, and a light sensor 26 detecting only light from the front side and arranged side by side, wherein a first real image 12 is formed on the other side of the optical image formation means 13 by the optical image formation means 13 from an image 11a on the display 11; a second real image 35 is formed on the display 11 through the optical image formation means 13 from reflected light from an indicating means 34 having (Continued)

come into contact with the first real image 12, and a position of the second real image 35 is detected by the light sensor 26.

5 Claims, 3 Drawing Sheets

(51) Int. Cl.
   *G06F 3/0346* (2013.01)
   *G06F 3/03* (2006.01)
(52) U.S. Cl.
   CPC ............ *G06F 3/0346* (2013.01); *G06F 3/042* (2013.01); *G06F 2203/04108* (2013.01)

(56) References Cited

U.S. PATENT DOCUMENTS

| | | | |
|---|---|---|---|
| 2006/0125789 | A1 | 6/2006 | Tu et al. |
| 2010/0110384 | A1* | 5/2010 | Maekawa ............... G02B 5/124 353/10 |
| 2010/0225616 | A1 | 9/2010 | Kiyose |
| 2010/0283838 | A1* | 11/2010 | Tomisawa .......... G02B 27/0093 348/51 |
| 2011/0181949 | A1* | 7/2011 | Hashikawa .......... G02B 17/006 359/463 |
| 2012/0242575 | A1 | 9/2012 | Wu et al. |
| 2012/0242636 | A1 | 9/2012 | Yuki et al. |
| 2013/0155030 | A1* | 6/2013 | Kawai .................... G06F 3/042 345/175 |
| 2013/0229357 | A1 | 9/2013 | Powell et al. |
| 2014/0111479 | A1* | 4/2014 | Krah ..................... G06F 3/0421 345/175 |
| 2014/0240228 | A1 | 8/2014 | Juni |

FOREIGN PATENT DOCUMENTS

| | | |
|---|---|---|
| JP | 2006-244446 A | 9/2006 |
| JP | 2008-241807 A | 10/2008 |
| JP | 2010-204995 A | 9/2010 |
| JP | 2011-29919 A | 2/2011 |
| JP | 2013-69272 A | 4/2013 |
| JP | 2014-26352 A | 2/2014 |
| JP | 2014-115733 A | 6/2014 |
| JP | 5509391 B1 | 6/2014 |
| TW | 200519708 A | 6/2005 |
| TW | I424336 B | 1/2014 |
| TW | I450134 B | 8/2014 |
| WO | 2011/071038 A1 | 6/2011 |

OTHER PUBLICATIONS

Notification of Reasons for Refusal dated Sep. 5, 2017, issued in counterpart Japanese Application No. 2016-079508, with English machine translation. (7 pages).

International Search Report dated Jun. 16, 2015, issued in counterpart International Application No. PCT/JP2015/064747 (2 pages).

* cited by examiner

APPARATUS AND METHOD FOR CONTACTLESS INPUT

TECHNICAL FIELD

The present invention relates to an apparatus and method for contactless input (i.e., an apparatus and method for contactlessly detecting an indicated position on a reproduced image) with and by which a real image becomes formed in the air, and signals can be input by operation of an indicating means (e.g., a finger) while looking at this real image (e.g., an image of a touch panel).

BACKGROUND ART

It has been known that when an image is displayed on a display and a particular position on the image is pressed by a finger, X and Y coordinates of the pressed part become detected by a pressure-sensitive sensor and the like, and a next behavior is performed based on this input signal (see, e.g., Patent Literature 1).

Also, as described in Patent Literature 2, when forming a matrix by arranging, right above a display, a number of light-emitting elements along X-axis and in parallel with one another and a number of light-receiving elements along Y-axis and in parallel with one another, and touching the surface of the display with an obstacle such as a finger and a pen, it is proposed to detect a position having come into direct contact with the display by crossing of the obstacle on the matrix.

On the other hand, in Patent Literature 3, there is proposed a method and apparatus that detect an indicated position on a reproduced image by using a optical image formation means in which a first light control panel having a number of first planar light-reflective portions arranged in parallel with one another at constant intervals inside a transparent flat plate and a second light control panel having a number of second planar light-reflective portions arranged in parallel with one another at constant intervals inside a transparent flat plate are arranged in direct contact with or proximity to each other in a manner that makes the first planar light-reflective portions and the second planar light-reflective portions orthogonal in planar view, simultaneously displaying an image on a display and an image formed by making infrared light irregularly reflect off the surface of the display as reproduced images in the air, and detecting a position of an indicating means having touched the reproduced images by a two-dimensional infrared camera.

As described in Patent Literature 4, there is also a proposal of an apparatus that cognizes a form of movement of a multi-touch by means of fingers or a stylus pen on a liquid-crystal surface through incorporating a light sensor in a transistor-shaped surface composing a liquid-crystal panel.

CITATION LIST

Patent Literature

Patent Literature 1: Japanese Unexamined Patent Application Publication No. 2006-039745
Patent Literature 2: Japanese Unexamined Patent Application Publication No. 2000-056928
Patent Literature 3: Japanese Patent No. 5509391
Patent Literature 4: Japanese Unexamined Patent Application Publication No. 2011-029919

SUMMARY OF INVENTION

Technical Problem

However, in the case of the touch panels described in Patent Literatures 1 and 2, a planar display existed, a particular planar image became displayed on the display, and detection of an input position was achieved by pressing a particular position on the display. Therefore, when the image is pressed by a finger, a pen and the like, the finger, the pen and the like necessarily touch or run into the display surface or the touch-panel surface, and sometimes the display and the like has become dirty or the display has gotten scratched.

In Patent Literature 3, besides a display, an infrared light generating means (a light of infrared rays), an irregular reflection surface for infrared light and an infrared camera are also required, which adds additional complexity to a structure of an apparatus. Also, since the infrared light generating means and the infrared camera are arranged at positions different from the display and the optical image formation means, there has been a problem in that installation spaces become required. Additionally, since the irregular reflection surface for infrared light becomes arranged on the front side of the display, there has been a problem in that part of light of the display becomes absorbed.

Moreover, in Patent Literature 3, since the optical image formation means is used, there is no focal point distance for image formation means unlike a lens, however, in a case of using the infrared camera it is necessary to set the camera's position and angle and to adjust the camera's focus on an image.

In Patent Literature 4, there is proposed an optical touch panel provided with a liquid-crystal panel having a backlight and also provided with a light sensor detecting touches on the liquid-crystal panel by reflected light. However, the touch panel is not a type that becomes formed an image in the air.

Touch panels for which displays are employed are used for ATMs and the like, however, since a large, indefinite number of people touch screens, it is not hygienic, and it has not been effective for the prevention of contact infections. Also, when light becomes irradiated toward the displays, light reflected off the displays becomes emitted from the displays, which sometimes made it hard to look at the displays.

The present invention has been made in view of the above circumstances, and an object thereof is to provide an apparatus and method for contactless input that make an image to be formed a spatial image that is not reflected light from other light sources, detect a position indicated by an indicating means when a particular position on this spatial image is indicated by the indicating means such as a finger, a pointer, and a stylus pen, and that enable signal inputs without physically touching a display.

Solution to Problem

In order to achieve the above object, according to the present invention, there is provided an apparatus for contactless input, comprising;

an optical image formation means having first minute reflective surfaces and second minute reflective surfaces crossed in planar view, the first minute reflective surfaces arranged numerously and standing on a same planar surface, the second minute reflective surfaces arranged numerously and standing on a same planar surface, the optical image formation means forming a second reflected light by receiving a first reflected light from each of the first minute reflective surfaces on the corresponding second minute reflective surfaces, a display provided on one side of and at a distance from the optical image formation means, and a light sensor arranged on the surface of the display, the light sensor having sensor elements detecting only light from the front side, the sensor elements provided side by side with one another, wherein a first real image is formed on the other side of the optical image formation means by the optical image formation means from an image on the display; a second real image is formed on the display through the optical image formation means from reflected light from an indicating means having come into contact with the first real image, and a position of the second real image is detected by the light sensor.

In the case of the apparatus for contactless input according to the present invention, it is preferred that part or all light emitted from the display be high-frequency-modulated (e.g., several kHz to 200 MHz).

Also, it is preferred that light emitted from the display contain infrared light, and that each of the sensor elements be an infrared sensor element. Here, it is preferred that the light sensor (an infrared sensor) be formed in the shape of a sheet.

In the case of the apparatus for contactless input according to the present invention, it is preferred that the back side of each of the sensor elements be provided with a non-transmissive material. When the sensor elements are light sensor elements of visible light, non-transmissive materials that block visible light are used, and when the sensor elements are infrared sensor elements, non-transmissive materials that block infrared light are used.

Additionally, in order to achieve the above object, there is provided a method for contactless input, comprising:

using (1) a optical image formation means having first minute reflective surfaces and second minute reflective surfaces crossed in planar view, the first minute reflective surfaces arranged numerously and standing on a same planar surface, the second minute reflective surfaces arranged numerously and standing on a same planar surface, the optical image formation means forming a second reflected light by receiving a first reflected light from each of the first minute reflective surfaces on the corresponding second minute reflective surfaces; (2) a display provided on one side of and at a distance from the optical image formation means; and (3) a light sensor provided on the surface of the display, the light sensor having sensor elements detecting (only) light from the front side and arranged side by side with one another;

the method for contactless input, comprising steps of:

forming a first real image on the other side of the optical image formation means from an image on the display;

forming a second real image on the surface of the display from an image of an indicating means having come into contact with the first real image; and optically detecting a position of the second real image by the light sensor.

In the case of the method for contactless input according to the present invention, it is preferred that light emitted from the display contain infrared light, and that each of the sensor elements be an infrared sensor element.

Advantageous Effects of Invention

Since the apparatus and method for contactless input according to the present invention have, on the surface of the display, the light sensor in which the sensor elements detecting only light from the front side are arranged side by side with one another, form a second real image on the display through the optical image formation means by reflected light from an indicating means, and detect a position of the second real image by the light sensor, a position of the indicating means can be detected relatively easily without providing a special infrared light producing means, infrared camera and the like.

Also, since the optical image formation means does not have a special focal point distance unlike a lens (or a camera), even when a position of the display is changed, an image of an indicating means becomes formed on the original display, and a position of the indicating means (e.g., a finger, a pen tip, etc.) can be detected more accurately.

Especially, in the case of the apparatus and method for contactless input according to the present invention, when light emitted from the display contains infrared light and the sensor elements of the light sensor are infrared sensor elements, by means of infrared light that cannot be visually confirmed, a position of an indicating means can be detected.

Moreover, in the case of the apparatus for contactless input according to the present invention, when the light sensor is formed in the shape of a sheet, it becomes easy to produce a display having a light sensor, and it becomes possible to adopt a normal display at the same time. When visible light is used as light, a conventional "liquid-crystal pad having light sensor" can be used for the display without any change. In this case, it is desirable to arrange the non-transmissive materials on the back side of the sensor elements to make the sensor elements detect only light from the front side. In a case of putting a sheet-like light sensor on a display, the light sensor can be provided separately from the display.

Additionally, the position of the indicating means (e.g., a tip of finger) is detected by arithmetic processing such as finding a center position of gravity by light reception data of sensor elements which is data of the second real image received by the sheet-like light sensor.

Here, when an image on the display is a keyboard and the like, it is preferred that a special light image (e.g., a spotlight) be provided at the center of each keyboard key. A position of the light sensor can thereby be accorded with these radial images, which enhances detection accuracy.

DESCRIPTION OF EMBODIMENTS

Next, with reference to the accompanying drawings, descriptions will be given on embodiments of the present invention.

Figure 1:
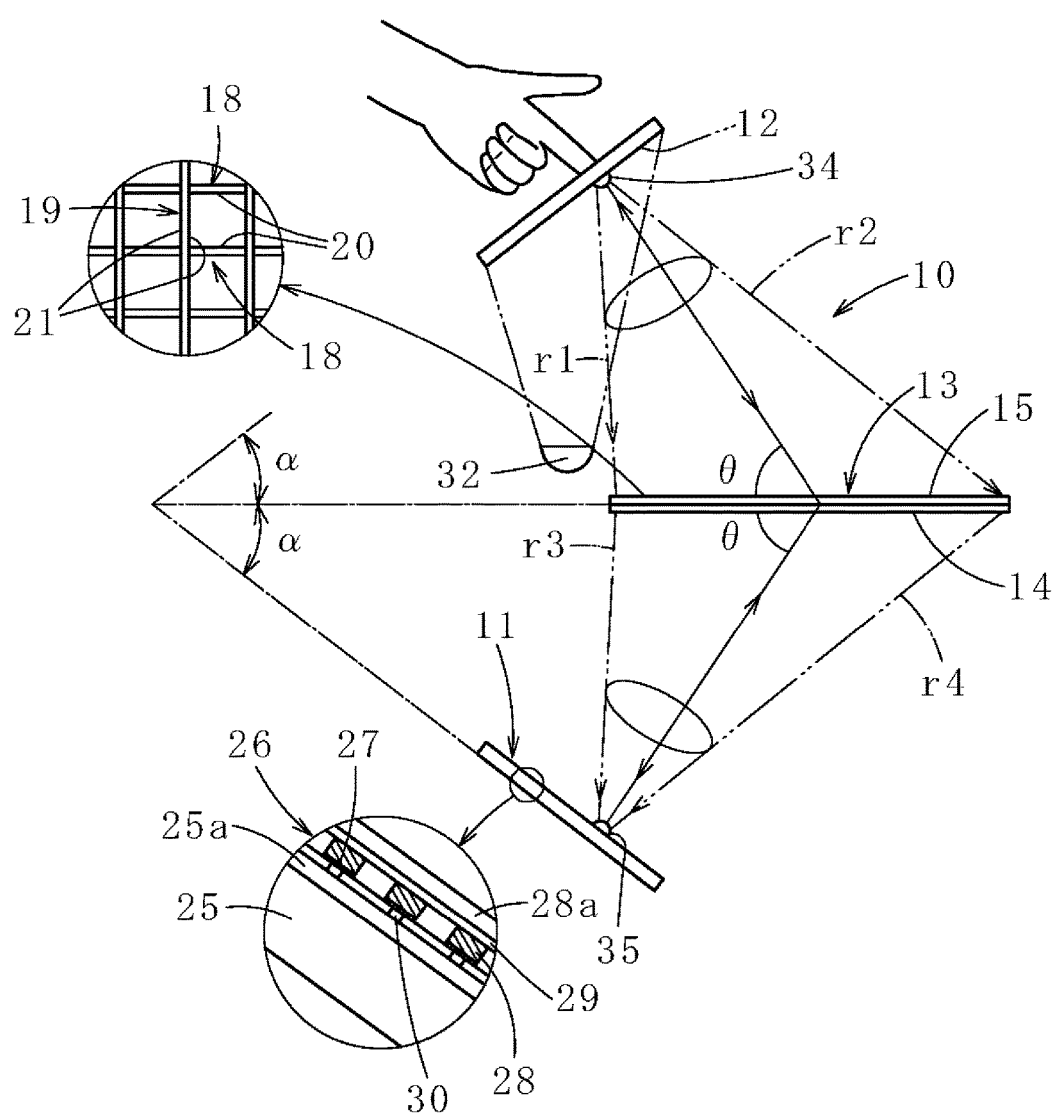
FIG. 1 is an explanatory diagram of an apparatus for contactless input according to one embodiment of the present invention.

As illustrated in FIG. 1, an apparatus for contactless input 10 according to one embodiment of the present invention is provided with an optical image formation means 13 that is formed at an angle $\alpha$ of 30 to 60 degrees from and at a distance from a planar display 11, and that forms a first real image 12 at a position symmetrical to an image 11a to be displayed on the display 11 (see FIG. 2) by making light enter from the image 11a on the display 11. Here, as a display, aside from one that is flat-plate-shaped such as an ordinary liquid-crystal display, a cubic one having a light source inside or one having concavities and convexities formed only on one side like a keyboard can alternatively be used, and depending on circumstances, one that is like a signboard (a still image display such as an electro luminescence display) having a light source (a backlight) inside can also be used. Especially, in a case of still images, a display can be either cubic or planar.

In a case where a transparent material such as transparent plastic and glass is used as a main material of the optical image formation means 13, when light enters into the transparent material from the air and goes out of the transparent material into the air, refraction due to the quality of the transparent material occurs. Thus, a position of the display 11 is determined in view of a refraction angle. The position of the display with respect to the optical image formation means can be determined freely to an extent, and focusing required in the case of using a lens system is not necessary.

Figure 2:
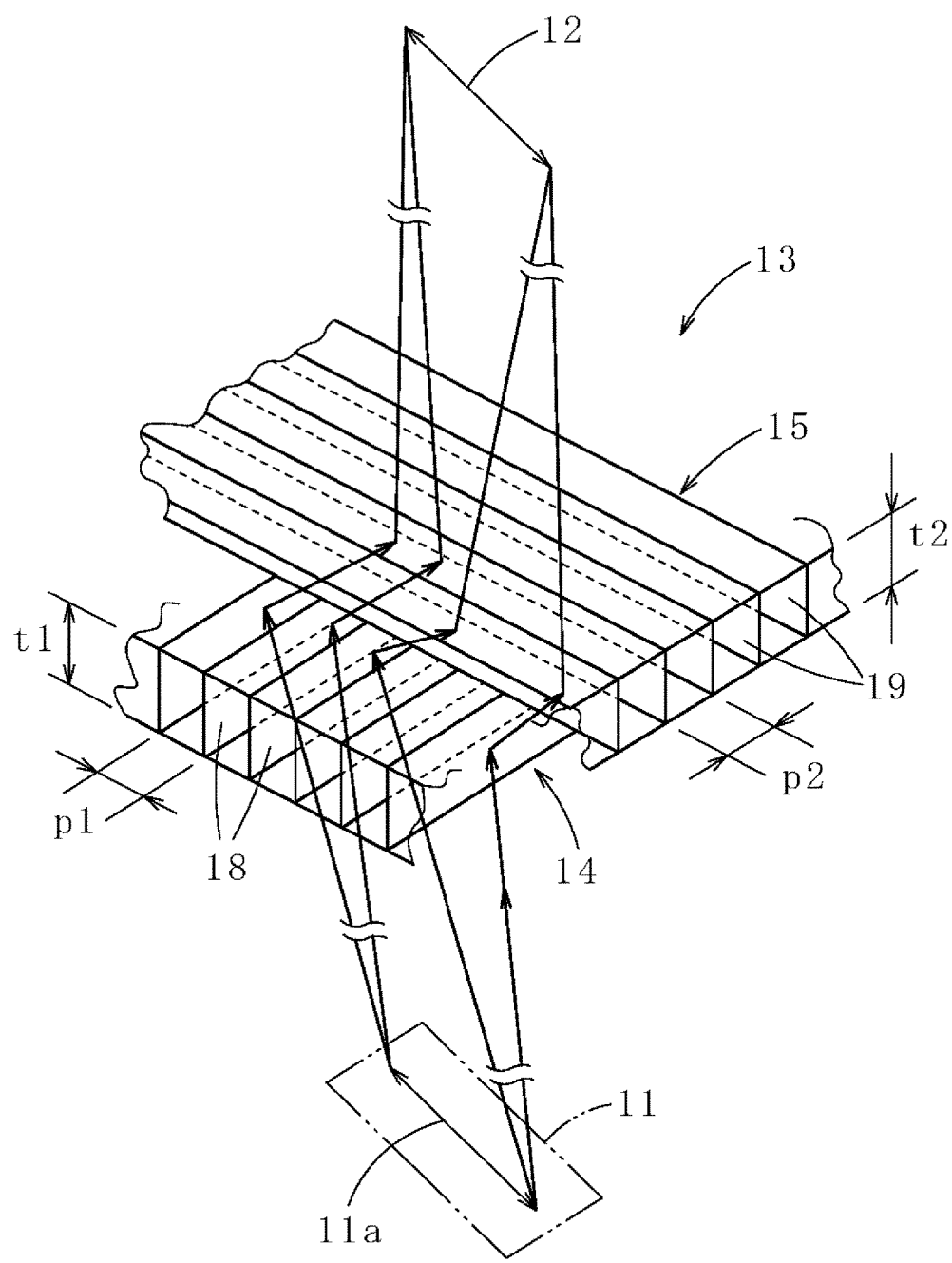
FIG. 2 is an explanatory diagram of an optical image formation means for use in the same apparatus for contactless input.

The optical image formation means 13 has, as illustrated in detail in FIG. 2, a tabular first light control panel 14 having a thickness t1 (e.g., 0.1 to 5 mm) and a tabular second light control panel 15 having a thickness t2 (e.g., 0.1 to 5 mm). The first light control panel 14 and the second light control panel 15 are arranged with one side of them in direct contact with or proximity to each other. A number of belt-shaped planar light-reflective portions 18 and a number of belt-shaped planar light-reflective portions 19 are respectively arranged perpendicularly to a surface on one side of the first light control panel 14 inside the first light control panel 14 at constant pitches (p1) and perpendicularly to a surface on one side of the second light control panel 15 inside the second light control panel 15 at constant pitches (p2). Here, the standing planar light-reflective portions 18 of the first light control panel 14 and the standing planar light-reflective portions 19 of the second light control panel 15 are arranged crossed (in an orthogonal state in this embodiment) in planar view.

Parts of the first and second light control panels 14 and 15 where the planar light-reflective portions 18 and 19 do not exist are formed of a transparent material such as glass or transparent plastic. It is preferred that these planar light-reflective portions 18 and 19 consist of metal sheets having high reflection efficiency, vapor-deposited metal, metal sheets each having an adhesive agent layer at an intermediate part, or mirror sheets, and it is preferred that both the front and back of the planar light-reflective portions 18 and 19 be reflective surfaces. However, the present invention also applies to a case where only one side of the planar light-reflective portions 18 and 19 are reflective surfaces. A production method of the optical image formation means 13 is described in, for example, WO 2009/131128 A1, etc. Among metals having high reflection efficiency are aluminum, silver, titanium, nickel, chromium and the like.

Normally, in view of production efficiency, it is preferable for pitches p1 between each of the planar light-reflective portions 18 and pitches p2 between each of the planar light-reflective portions 19 to be the same, and it is preferable for the thickness t1 of the first light control panel 14 and the thickness t2 of the second light control panel 15 to be the same. Thus, the pitches between both the planar light-reflective portions 18 and the planar light-reflective portions 19 will hereinafter be represented by p, and the thickness of the first and second light control panels 14 and 15 will hereinafter be represented by t.

When such the optical image formation means 13 is watched in planar viewed, as illustrated in a partially enlarged view in FIG. 1, the planar light-reflective portions 18 and the planar light-reflective portions 19 cross one another and form a number of square frames. An aspect ratio γ (height/width) of a single frame (i.e., a frame of one layer) in this case is thickness (t)/pitch (p). The aspect ratio γ is approximately 1 to 4.5, however, in order to obtain an even brighter first real image 12 by making light reflect off one of the planar light-reflective portions 18 and one of the planar light-reflective portions 19 a plurality of times, it is desirable for the aspect ratio γ to be 2.5 to 4.5 (more particularly, one that exceeds 3 and is 4.5 or less).

Each frame portion of the first light control panel 14 and the second control panel 15 forms each of first minute reflective surfaces 20 and each of second minute reflective surfaces 21. The first minute reflective surfaces 20 and the second minute reflective surfaces 21 are crossing in plan view. These first minute reflective surfaces 20 are arranged numerously and standing on a same planar surface, and these second minute reflective surfaces 21 are arranged numerously and standing on a same planar surface.

Therefore, light from the display 11 arranged on one side of the optical image formation means 13 reflects off each of the first minute reflective surfaces 20 of the first light control panel 14 (a first reflected light) on the front side (the side of the display 11), and furthermore reflects off the corresponding second minute reflective surfaces 21 of the second light control panel 15 (a second reflected light), then forms a first real image 12 on the other side of the optical image formation means 13. This first real image 12 becomes formed in a space portion, and becomes the same in size as the image 11a formed on the display 11. Incident light and reflected light include cases where light jumps over one frame and reflects, aside from cases where light reflects only in one frame.

Next, with reference to FIGS. 1, 3(A) and 3(B), descriptions will be given on the display 11 having been used for the apparatus for contactless input 10. This display 11 is basically a liquid-crystal type, and has a backlight 24, a liquid-crystal display 25, a sheet-like infrared sensor 26 that is an example of light sensors, and a superficial transparent protection plate 28a.

It is preferred that the backlight 24 emit visible light as well as infrared light, and in this case, it is preferred that (part or all of) light from the backlight 24 be high-frequency-modulated. When both a light-emitting means A that emits visible light and a light-emitting means B that emits infrared light are provided separately to the backlight 24, only the light-emitting means B may be high-frequency-modulated. As the backlight 24, a light-emitting diode and a fluorescent light can be used.

Further, the display using organic or inorganic electro-luminescence (for example) can be used instead of the liquid-crystal display.

Figure 3A:
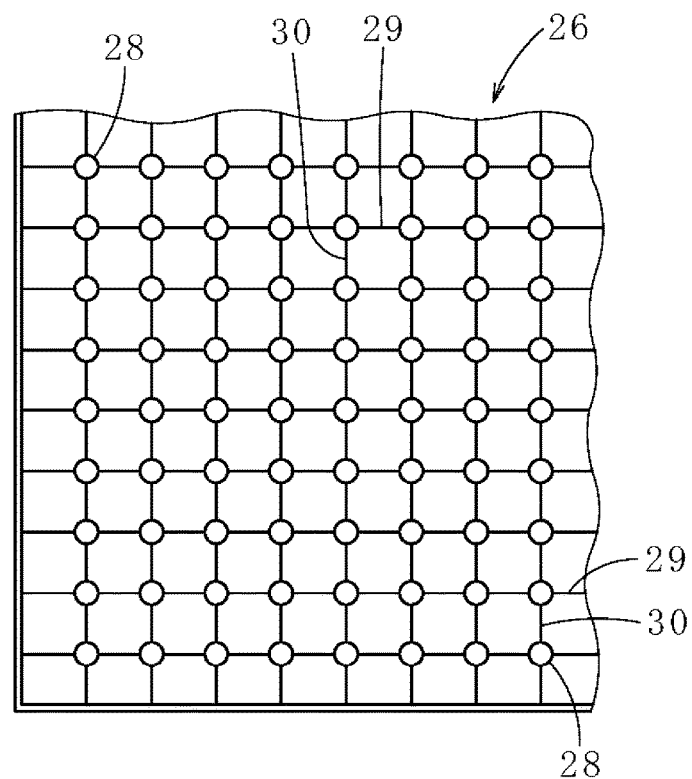
FIGS. 3(A) and 3(B) are an explanatory diagram of a display for use in the same apparatus for contactless input.
Figure 3B:
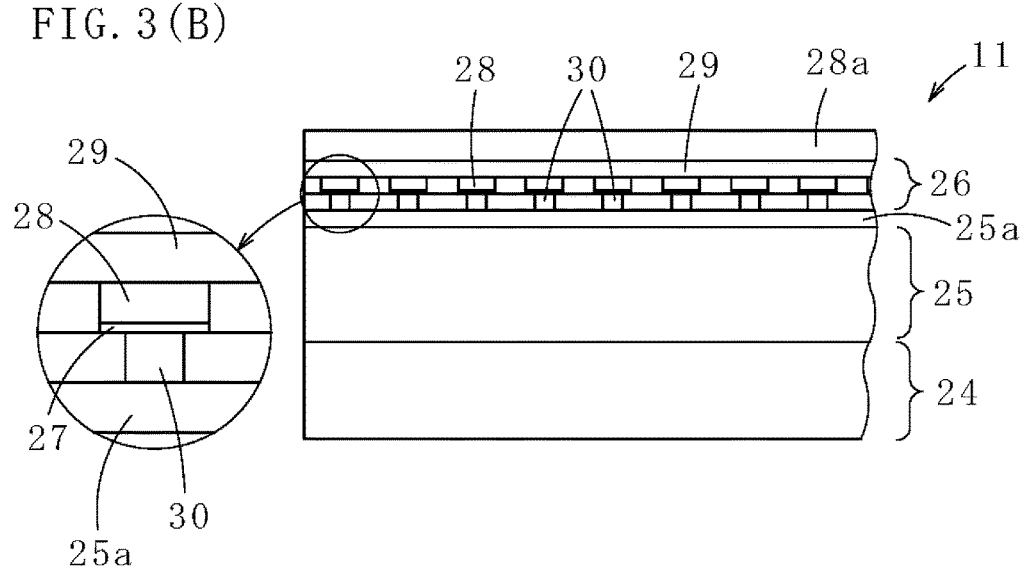

The sheet-like infrared sensor 26 provided on the surface of the display 11 has, as illustrated in FIGS. 3(A) and 3(B), a number of infrared sensor elements (an example of sensor elements) 28 arranged in a lattice pattern, and conductor lines 29 and conductor lines 30 are arranged respectively on top of the infrared sensor 26 and underneath the infrared sensor 26. On the back of the infrared sensor elements 28, conductive or non-conductive non-transmissive materials 27 are provided to make the infrared sensor elements 28 detect only light from the front side. A numeral 25*a* represents a transparent sheet.

The infrared sensor element 28 and the conductive lines 29 and 30 are transparent, and allow visible light and infrared light to pass through easily. This infrared sensor 26 reacts only to infrared light and produces electromotive force. As infrared sensor elements, it is also possible to use a sensor that reacts to visible light and infrared light and to provide a filter that allows only infrared light to pass through at the upper portion of the sensor. One or both of the infrared sensor elements and conductor lines may be non-transparent, and in this case, it is desirable to enhance an aperture ratio of a display by narrowing the area and width as much as possible.

The liquid-crystal display 25 has a well-known structure. One each of color filters of R (red), G (green), and B (blue) that are part of a visible-light emitting portion are arranged in parallel with one another, one of liquid-crystal cells is provided right underneath each of the R, G and B color filters, and visible light is emitted by means of light from the lower portion of the backlight 24 turned on and off and brightness-controlled by the liquid-crystal cells. Therefore, by means of this liquid-crystal display 25, an image 11*a* of a predetermined shape (e.g., a keyboard, etc.) becomes displayed.

The present invention is also applicable to those having a structure in which light-emitting diodes of R, G and B (or other colors) arranged in parallel are used as a display. When one in which an R light-emitting diode, a G light-emitting diode, a B light-emitting diode, and an infrared sensor are arranged side by side is considered as a single block, a display can be one in which these blocks are arranged in plane state.

Here, when visible light is used as light, and a visible-light sensor is used, an infrared blocking sheet can be provided on each of the planarly arranged blocks.

In a case that strength of infrared light emitted from the display is not sufficient, on the other side of the optical image formation means 13, an infrared illuminator 32 that illuminates the whole of a range where a first real image 12 of an image 11*a* on the display 11 becomes formed can be arranged. A hood (reflector) is provided on this illuminator 32 so that the light may not enter into the infrared sensors 26 and the optical image formation means 13.

Light from the illuminator 32 is separated from natural light by performing high frequency modulation. As a matter of course, when a control circuit makes a signal processing of the high frequency modulated infrared light received by the infrared sensor, the control circuit has an electric filter circuit that inputs only specific frequencies (high frequencies) among light (which is converted to an electric signal) that enters through the infrared sensor elements 28.

Next, descriptions will be given on a method for contactless input in which the apparatus for contactless input 10 is used.

As illustrated in FIG. 1, the optical image formation means 13 is arranged at a predetermined position, and on one side of the optical image formation means 13, the display 11 becomes arranged. On this display 11, an image 11*a* of, for example, a touch panel becomes displayed, and the image 11*a* can be changed to an arbitrary image by, for example, a selector switch and the like. Since the display 11 emits light, by the emitted light passing through the optical image formation means 13, a first real image 12 of an image 11*a* to be formed on the display 11 becomes reproduced at a symmetrical position centering on the optical image formation means 13.

In this case, the first real image 12 becomes formed in space, and even when a position of the display 11 is changed, the first real image 12 does not become out of focus, and a sharp image becomes reproduced. When a finger 34 that is an example of the indicating means touches this first real image 12, the finger 34 becomes illuminated with light (infrared light) from the display 11, and reflected light from the finger 34 (an image of the finger 34) forms a second real image 35 on the display 11 through the optical image formation means 13. Numerals r1 to r4 represent reflected light rays from the finger 34.

Since this second real image 35 becomes formed clearly, a position of the second real image 35 is optically detected by the infrared sensor 26. This enables clear recognition of a part on the first real image 12 pressed by the finger 34. This second real image 35 becomes formed clearly regardless of the position of the display 11. Also, in FIG. 1, θ indicates that an indicating means (the finger 34) and a second real image 35 is symmetrical to each other with respect to the optical image formation means 13.

Further, when the infrared light power does not have sufficient strength more than a specified value, the infrared illuminator 32 is preferably used. The position of the second real image 35 is recognized through an image processing of data obtained by detecting the location of the infrared sensor elements 28 on the sheet-like (planate) infrared sensor 26.

In the above embodiments, infrared light that cannot be visually confirmed was used as light for detecting real images, however, the present invention also applies to a case where visible light is used instead. In this case, by high-frequency-modulating visible light, the visible light can be separated from ambient light. Here, it is also possible to incorporate a light sensor into each of the blocks of R, G, and B light-emitting portions as visible light sensors.

It is preferred that a light-shielding member be provided on the back side of each of sensor elements in this case to detect only light from the front side of the display.

It is preferred that the sensor elements and conductor lines to be connected with the sensor elements be transparent, however, the present invention applies to cases where sensor elements and conductive lines are non-transparent.

In a case of not using infrared light, an ordinary liquid-crystal panel can be used, however, a group of light-emitting diodes each emitting light of a predetermined color can also be used alternatively.

The present invention is not limited to the above embodiments, and for example, an image on a display does not necessarily have to be a color image, and can also be a monochrome image.

In the case of the present invention, displays include not only those simply displaying images, but also illuminated or light-transmitted real images and the like. That is, as a display, when using a photo transmitting member (a planar member, a curved member) such as an ordinary signboard, it is desirable to provide a light-shielding member on the back of each sensor element, or ones that detect only light from the front side (visible light or infrared light) can alternatively be used as the sensor elements.

The present invention also applies to cases where an apparatus for contactless input is formed by combining each constructional element described above.

Further, the sensor sheet can be separated from the display or jointed to the display.

INDUSTRIAL APPLICABILITY

The apparatus and method for contactless input (the apparatus and method for contactlessly detecting an indicated position on a reproduced image) according to the present invention, when used for control panels of a variety of machinery, displays a reproduced image of a control panel having manual operation buttons (e.g., a keyboard, a touch panel) in space, and is capable of obtaining input signals when the manual operation buttons in the reproduced image become pressed. Therefore, the apparatus and method for contactless input according to the present invention can be used not only for control panels of factory machines, but also optimally for touch panels of mobile phones, personal computers, automobiles, vessels and the like.

REFERENCE SIGNS LIST

10: apparatus for contactless input, 11: display, 11a: image, 12: first real image, 13: optical image formation means, 14: first light control panel, 15: second light control panel, 18, 19: planar light-reflective portion, 20: first minute reflective surface, 21: second minute reflective surface, 24: backlight, 25: liquid-crystal display, 25a: transparent sheet, 26: infrared sensor, 27: non-transmissive material, 28: infrared sensor element, 28a: transparent protection plate, 29, 30: conductive line, 32: illuminator, 34: finger, 35: second real image

The invention claimed is:

1. An apparatus for contactless input, comprising;
    an optical image formation means having first minute reflective surfaces and second minute reflective surfaces crossed in planar view, the first minute reflective surfaces arranged numerously and standing on a same planar surface, the second minute reflective surfaces arranged numerously and standing on a same planar surface, the optical image formation means forming a second reflected light by receiving a first reflected light from each of the first minute reflective surfaces on the corresponding second minute reflective surfaces;
    a display provided on one side of, at a distance from and at an angle of 30 to 60 degrees from the optical image formation means, with light emitted from the display containing visible light and infrared light, and
    a sheet-like infrared sensor arranged on a surface of the display, the infrared sensor having infrared sensor elements detecting only infrared light from a front side of the display facing the optical image formation means by having a non-transmissive material on a back side of each of the infrared sensor elements, the infrared sensor elements provided side by side with one another,
    wherein a first real image is formed on the other side of the optical image formation means by the optical image formation means from an image on the display, a second real image is formed on the display through the optical image formation means from reflected light from an indicating means having come into contact with the first real image, and a position of the second real image is detected by the infrared sensor.

2. The apparatus for contactless input according to claim 1, wherein part or all of light emitted from the display is high-frequency-modulated.

3. The apparatus for contactless input according to claim 1, wherein an infrared illuminator that illuminates a range where the first real image becomes formed is provided on the other side of the optical image formation means.

4. The apparatus for contactless input according to claim 3, wherein infrared light emitted from the infrared illuminator is separated from natural light by performing high-frequency-modulation.

5. A method for contactless input, using: (1) an optical image formation means having first minute reflective surfaces and second minute reflective surfaces crossed in planar view, the first minute reflective surfaces arranged numerously and standing on a same planar surface, the second minute reflective surfaces arranged numerously and standing on a same planar surface, the optical image formation means forming a second reflected light by receiving a first reflected light from each of the first minute reflective surfaces on the corresponding second minute reflective surfaces; (2) a display provided on one side of, at a distance from, and at an angle of 30 to 60 degrees from the optical image formation means, with light emitted from the display containing visible light and infrared light; and (3) a sheet-like infrared sensor provided on a surface of the display, the infrared sensor having infrared sensor elements detecting infrared light from a front side of the display facing the optical image formation means by having a non-transmissive material on a back side of each of the infrared sensor elements, the infrared sensor elements being arranged side by side with one another, the method for contactless input comprising the steps of:
    forming a first real image on the other side of the optical image formation means from an image on the display;
    forming a second real image on the surface of the display through the optical image formation means from an image of an indicating means having come into contact with the first real image; and
    optically detecting a position of the second real image by the infrared sensor.

* * * * *